(12) United States Patent
Marupaduga et al.

(10) Patent No.: US 9,198,182 B1
(45) Date of Patent: Nov. 24, 2015

(54) METHOD AND SYSTEMS FOR OPTIMIZING CARRIER AGGREGATION IMPLEMENTATION FOR UE IN-BUILDING COVERAGE IN LTE NETWORKS

(71) Applicant: Sprint Communications Company L.P., Overland Park, KS (US)

(72) Inventors: Sreekar Marupaduga, Overland Park, KS (US); Rajveen Narendran, Olathe, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 140 days.

(21) Appl. No.: 14/061,876

(22) Filed: Oct. 24, 2013

(51) Int. Cl.
| | |
|---|---|
| *H04W 24/00* | (2009.01) |
| *H04W 72/04* | (2009.01) |
| *G01C 21/00* | (2006.01) |
| *G01S 19/40* | (2010.01) |
| *G01S 19/42* | (2010.01) |
| *H04W 4/02* | (2009.01) |
| *G01S 5/00* | (2006.01) |
| *H04W 92/10* | (2009.01) |
| *H04W 28/02* | (2009.01) |
| *H04L 5/00* | (2006.01) |

(52) U.S. Cl.
CPC .......... *H04W 72/0453* (2013.01); *G01S 5/0027* (2013.01); *G01S 5/0054* (2013.01); *G01S 19/42* (2013.01); *H04L 5/0069* (2013.01); *H04W 4/025* (2013.01); *H04W 28/0226* (2013.01); *H04W 72/042* (2013.01); *H04W 92/10* (2013.01)

(58) Field of Classification Search
CPC ....... H04L 5/001; H04L 5/003; H04L 5/0058; H04L 5/0069; H04W 4/02; H04W 4/025; H04W 28/0226; H04W 36/32; H04W 72/04; H04W 72/0406; H04W 72/042; H04W 72/0453; H04W 74/002; H04W 74/006; H04W 76/02; H04W 84/08; H04W 92/10; G01C 21/20; G01C 21/206; G01C 21/26; G01S 5/0009; G01S 5/0027; G01S 5/0054; G01S 13/06; G01S 13/42; G01S 13/878; G01S 19/39; G01S 19/42

USPC ........ 370/252, 329, 343; 342/357.2; 455/450, 455/456.1, 509; 701/408, 468, 483, 517
See application file for complete search history.

(56) References Cited

U.S. PATENT DOCUMENTS

| | | | | |
|---|---|---|---|---|
| 6,813,497 | B2 * | 11/2004 | Hutcheson et al. | 455/453 |
| 7,844,273 | B2 * | 11/2010 | Scheinert | 455/444 |
| 8,792,903 | B2 * | 7/2014 | Ische et al. | 455/456.1 |
| 8,812,015 | B2 * | 8/2014 | Das et al. | 455/456.1 |
| 9,014,721 | B2 * | 4/2015 | Das et al. | 455/456.2 |
| 2005/0079872 | A1 * | 4/2005 | Hutcheson et al. | 455/446 |
| 2005/0213527 | A1 * | 9/2005 | Xie | 370/315 |

(Continued)

*Primary Examiner* — Alpus H Hsu (57) ABSTRACT

A wireless access node and method for a carrier aggregation (CA) communication mode between the wireless access node and a User Equipment device (UE) are provided. The wireless access node in one example includes a communication interface configured to allocate one or more traffic channels and a signaling channel between the wireless access node and the UE and a processing system coupled to the communication interface and configured to determine a UE location of the UE in preparation for switching to a CA communication mode, determine if the UE is in-building using the UE location and setting a UE in-building state based on the UE location, and if the UE in-building state is true, then allocate a plurality of CA traffic channels to the UE from a building-penetrating frequency band.

8 Claims, 5 Drawing Sheets

(56) References Cited

U.S. PATENT DOCUMENTS

| | | | |
|---|---|---|---|
| 2008/0234928 A1* | 9/2008 | Matsuoka | 701/204 |
| 2010/0176992 A1* | 7/2010 | T'siobbel | 342/357.25 |
| 2010/0246544 A1* | 9/2010 | Brisebois et al. | 370/338 |
| 2010/0250134 A1* | 9/2010 | Bornstein et al. | 701/220 |
| 2011/0115672 A1* | 5/2011 | Lee | 342/357.31 |
| 2011/0117907 A1 | 5/2011 | Hooli et al. | |
| 2012/0213183 A1 | 8/2012 | Chen et al. | |
| 2012/0258703 A1 | 10/2012 | Hakola et al. | |
| 2013/0010964 A1* | 1/2013 | Fong et al. | 380/277 |
| 2013/0072226 A1* | 3/2013 | Thramann | 455/456.1 |
| 2013/0214968 A1* | 8/2013 | Parr et al. | 342/357.23 |
| 2013/0235746 A1* | 9/2013 | Patel et al. | 370/252 |
| 2013/0303195 A1* | 11/2013 | Bahl et al. | 455/456.3 |
| 2013/0322363 A1* | 12/2013 | Chen et al. | 370/329 |
| 2014/0278054 A1* | 9/2014 | Tidd et al. | 701/409 |
| 2015/0003302 A1* | 1/2015 | Ekpenyong | 370/280 |

\* cited by examiner

METHOD AND SYSTEMS FOR OPTIMIZING CARRIER AGGREGATION IMPLEMENTATION FOR UE IN-BUILDING COVERAGE IN LTE NETWORKS

TECHNICAL BACKGROUND

The immense growth in cellular communications requires that wireless infrastructure be used as intelligently as possible. Newer wireless access networks, such as wireless access networks using the Long Term Evolution (LTE) communication protocol, are designed to use bandwidth more efficiently and to conduct communications more efficiently. In LTE, a wireless access node allocates a traffic channel and a signaling channel to a wireless User Equipment (UE), wherein the UE can exchange both signaling and communications with the wireless access node. For communications from a wireless access node to individual UEs, the LTE communication protocol uses Orthogonal Frequency-Division Multiple Access (OFDMA) digital modulation. In OFDMA, subsets of sub-carriers are assigned to individual UEs, allowing simultaneous low data rate transmission from several users. As a result, an individual UE can be allocated a time slot and a subcarrier frequency band. For a communication from the individual UEs to the wireless access node, LTE employs Single-Carrier Frequency-Division Multiple Access (SC-FDMA) digital modulation.

Carrier aggregation (CA) is a new development in wireless access networks. The CA communication mode is useful where a UE requires extra bandwidth. In a carrier aggregation communication mode, the wireless access node allocates multiple traffic channels to the UE device. The UE can employ the multiple (i.e., aggregated) traffic channels to achieve a higher rate of communications.

One environment where the CA communication mode can be applied is when a UE device is within a building. Within a building, radio waves may be absorbed or reflected by the structure. As a result, a UE within a building will have difficulty in both sending signals to a wireless access node and in receiving signals from a wireless access node. A drawback of using a CA communication mode for a UE within a building is that allocating multiple traffic channels that are absorbed/reflected does not enhance communications as much as it should, and the extra allocated traffic channels are wasted.

OVERVIEW

A wireless access node and method for a carrier aggregation (CA) communication mode between the wireless access node and a User Equipment device (UE) are provided. The wireless access node in one example includes a communication interface configured to allocate one or more traffic channels and a signaling channel between the wireless access node and the UE and a processing system coupled to the communication interface and configured to determine a UE location of the UE in preparation for switching to a CA communication mode, determine if the UE is in-building using the UE location and setting a UE in-building state based on the UE location, and if the UE in-building state is true, then allocate a plurality of CA traffic channels to the UE from a building-penetrating frequency band.

DETAILED DESCRIPTION

Figure 1:
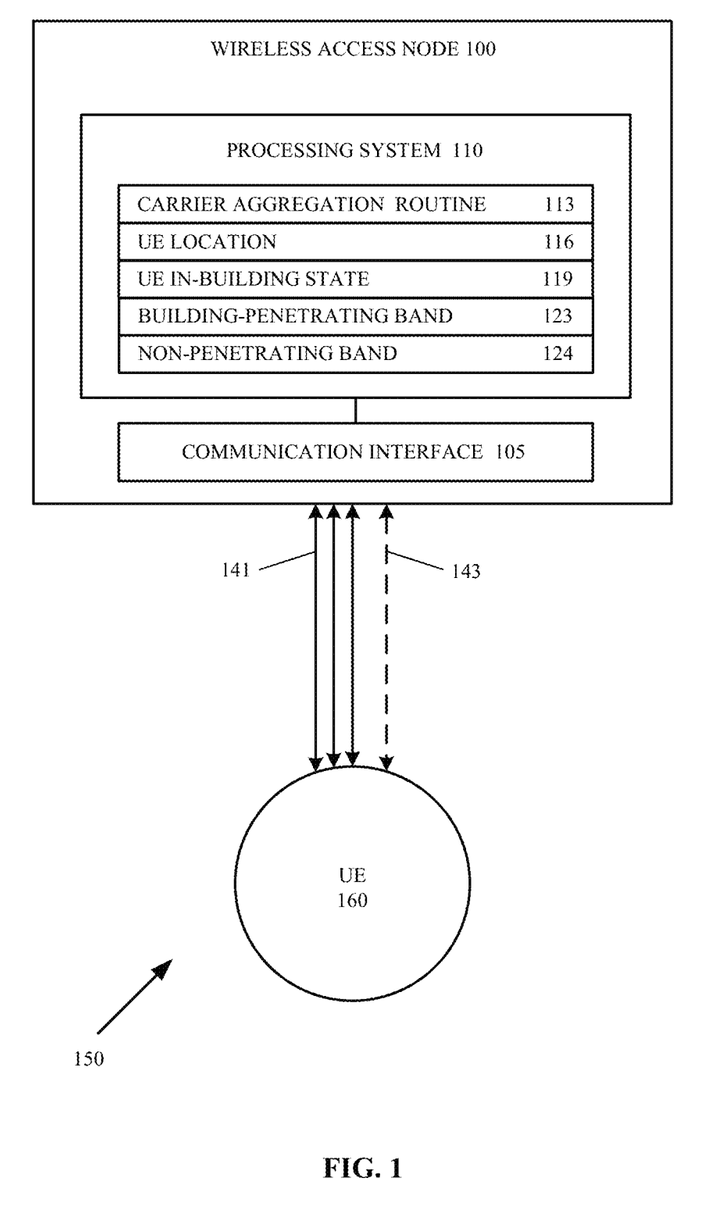
FIG. 1 shows an exemplary wireless access node within a wireless communication environment.

FIG. 1 shows an exemplary wireless access node within a wireless communication environment 150. The wireless communication environment 150 comprises at least a portion of a wireless access network. The wireless communication environment 150 includes the wireless access node 100 and one or more User Equipment devices (UEs) 160. The wireless access node 100 is connected, wired or wirelessly, to other components and portions of the wireless access network.

In the figure, the wireless access node 100 has allocated one signaling channel 143 for carrying signals to and from the UE 160 and has allocated a plurality of traffic channels 141 to the UE 160 for carrying message traffic. This is termed Carrier Aggregation (CA), where the UE 160 is allocated more than one traffic channel. The CA communication mode enables a higher communication rate between the wireless access node 100 and the UE 160. Although three traffic channels 141 are shown in the figure, it should be understood that any number of traffic channels 141 can be allocated in a CA communication mode.

The wireless communication environment 150 is configured to perform carrier aggregation (CA) with at least some of the UEs 160 that are operating within the region of the wireless access node 100. The wireless communication environment 150 may operate according to any suitable wireless communication protocol, including a Long Term Evolution (LTE) protocol, for example.

In response to the control signaling over the signaling channel 143, the wireless access node 100 and the UE 160 wirelessly exchange communications over the plurality of traffic channels 141. The communications transferred over the plurality of traffic channels 141 have forward components (from the wireless access node 100 to the UE 160) and reverse components (from the UE 160 to the wireless access node 100).

A drawback of carrier aggregation is that when a UE device is within a building, radio waves may be absorbed or reflected by the structure. As a result, a UE 160 within a building will have more difficulty in both sending signals to a wireless access node and in receiving signals from a wireless access node. Additional traffic channels allocated to the UE 160 will be of no benefit if the communications exchanged over the multiple traffic channels are reflected and/or absorbed by the building.

Figure 2:
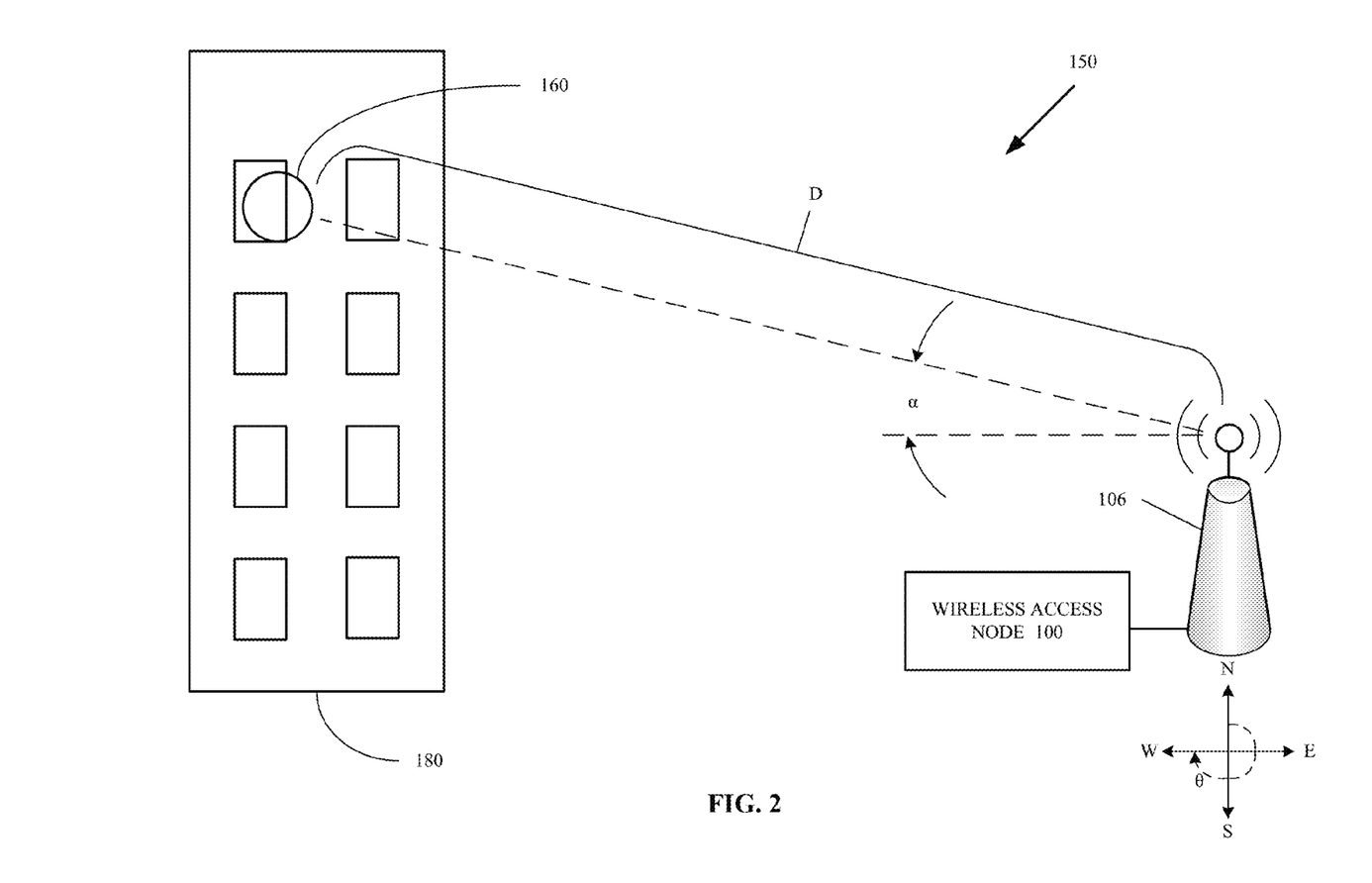
FIG. 2 shows the wireless communication environment where the UE is within a building.

FIG. 2 shows the wireless communication environment 150 where the UE 160 is within a building 180. The building 180 can be constructed of any materials. The building 180 can be of any size. The building 180 can be of any height and can include multiple rooms and multiple floors.

In this example, the wireless access node 100 is coupled to a tower or other infrastructure 106. The infrastructure 106 can include wireless transceivers and associated circuitry for transmitting and receiving wireless signals.

As previously discussed, the building 180 can interfere with the transmission of radio waves of certain frequencies or frequency bands. For example, radio waves in the 1.9 gigahertz (GHz) and 2.5 GHz cellular frequency bands are problematically reflected and/or absorbed by portions of a building. In contrast, radio waves in an 800 megahertz (MHz) cellular frequency band are minimally affected by buildings.

Referring again to FIG. 1, the wireless access node 100 in the example shown includes a communication interface 105 and a processing system 110 coupled to the communication interface 105. The communication interface 105 is configured to allocate traffic channels and signaling channels between the wireless access node 100 and the UE 160. The processing system 110 includes a carrier aggregation routine 113, a UE location 116, a UE in-building state 119, a building-penetrating frequency band 123, and a non-penetrating frequency band 124. Other routines, values, or data can be included in the processing system 210, but are omitted for clarity.

The carrier aggregation routine 113 performs a carrier aggregation function. The carrier aggregation routine 113 determines whether a carrier aggregation mode is possible. The carrier aggregation routine 113 determines whether a communication load in the UE 160 is low or high. If the communication load in the UE 160 is high, the wireless access node 100 can elect to initiate a CA communication mode for the UE 160.

The carrier aggregation routine 113 determines whether a traffic level in the wireless access node 100 is low or high, among other things. If the traffic level in the wireless access node 100 is high, the wireless access node 100 can elect to not initiate a CA communication mode for the UE 160.

The carrier aggregation routine 113 determines whether the UE is within the building 180. The carrier aggregation routine 113 determines whether to use a building-penetrating frequency band 123 for allocated traffic channels of the CA communication mode or whether to use a non-penetrating frequency band 124. The carrier aggregation routine 113 allocates traffic channels and switches the UE 160 to the CA communication mode.

The UE location 116 comprises location information for the UE 160. The UE location can comprise a geographic location of the UE in some examples. The UE location can comprise a location of the UE in three dimensions in some examples. Using the UE location 116, the wireless access node 100 can determine whether the UE 160 is within the building 180.

The UE in-building state 119 indicates whether the UE 160 has been determined to be within the building 180. If the UE 160 has been determined to be within the building 180 (or within a building), then the UE in-building state 119 will be set to be TRUE. Otherwise, the UE in-building state 119 will be set to FALSE. The wireless access node 100 can use the UE location 116 in order to set or clear the UE in-building state 119.

The CA communication mode can be configured by the wireless access node 100 according to the UE in-building state 119. If the UE in-building state 119 is true for the UE 160, then the wireless access node 100 can allocate a plurality of CA mode traffic channels 141 to the UE 160. Moreover, if the UE in-building state 119 is true, then the wireless access node 100 can allocate a plurality of traffic channels from the building-penetrating frequency band 123. If the UE in-building state 119 is false for the UE 160, then the wireless access node 100 can allocate a plurality of CA mode traffic channels from the non-penetrating frequency band 124.

The building-penetrating frequency band 123 comprises a band or bands of frequencies that are known to have good transmission/reception qualities when the UE 160 is within a building. In one example, the building-penetrating frequency band 123 comprises an 800 MHz cellular frequency band.

The non-penetrating frequency band 124 comprises a band or bands of frequencies that are known to have reduced or poor transmission/reception qualities when the UE 160 is within a building. In one example, the non-penetrating frequency band 124 comprises the 1.9 and/or 2.5 GHz cellular frequency bands.

In some examples, the carrier aggregation routine 113 when executed by the wireless access node 100 in general or the processing system 110 in particular operates to direct the wireless access node 100 or the processing system 110 to determine a UE location 116 of a UE 160 in preparation for switching to a CA communication mode, determine if the UE 160 is in-building using the UE location 116 and setting a UE in-building state 119 based on the UE location 116, and if the UE in-building state 119 is true, then allocate a plurality of CA traffic channels 141 to the UE 160 from a building-penetrating frequency band 123.

The building-penetrating frequency band is used only for in-building UEs. The non-in-building UEs are not allocated traffic channels from the building-penetrating frequency band as long as there are non-building-penetrating frequency band traffic channels available to be allocated.

Figure 3:
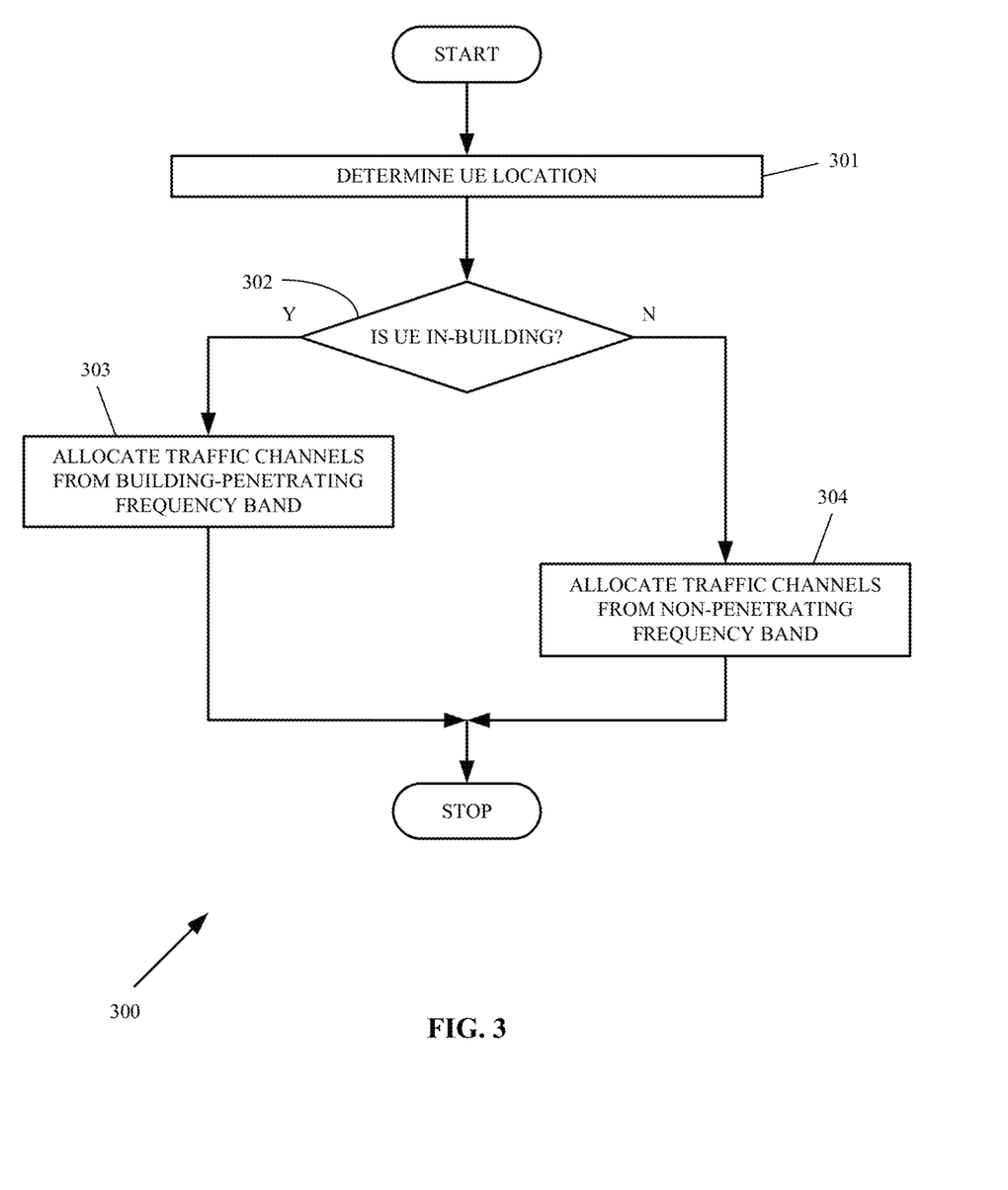
FIG. 3 is a flowchart of an exemplary carrier aggregation method for a CA communication mode between a wireless access node of a wireless access network and a UE device.

FIG. 3 is a flowchart 300 of an exemplary carrier aggregation method for a CA communication mode between a wireless access node of a wireless access network and a UE device. In step 301, the wireless access node determines a UE location. The UE location comprises a location of the UE to be used in the CA communication mode. The UE location can comprise a geographic location of the UE in some examples. The UE location can comprise a location of the UE in three dimensions in some examples.

In step 302, the wireless access node determines whether the UE is located within a building. If the UE is located within a building, then the wireless access node can allocate from a different frequency band than if the UE is not located within a building. If the UE is in-building, then the method branches to step 303. Otherwise, where the UE is not in-building, then the method branches to step 304.

In step 303, where the UE is in-building, the wireless access node allocates a plurality of traffic channels to the UE from a building-penetrating frequency band, as previously discussed.

In step 304, where the UE is not in-building, the wireless access node allocates a plurality of traffic channels to the UE from a non-penetrating frequency band, as previously discussed.

Figure 4:
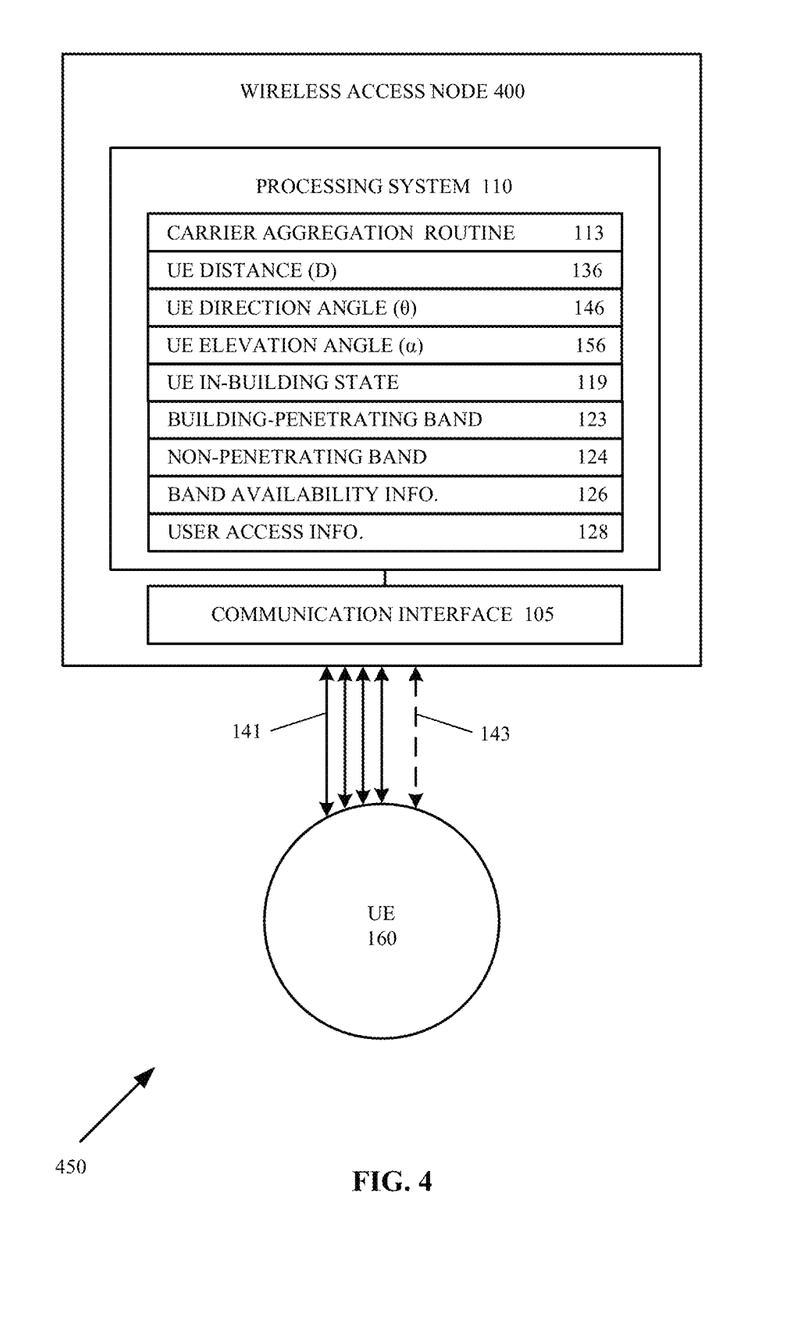
FIG. 4 shows another exemplary wireless access node within a corresponding communication environment.

FIG. 4 shows another exemplary wireless access node 400 within a corresponding communication environment 450. The wireless access node 100 of FIG. 1 maybe the same as or different from the wireless access node 400 of FIG. 4. The wireless access node 450 in this example further includes a UE distance 136, a UE direction angle 146, a UE elevation angle 156, band availability information 126, and user access information 128. Other routines, values, or data can be included in the processing system 210, but are omitted for clarity.

The UE distance 136 comprises a distance measurement from the wireless access node 400 to the UE 160. The wireless access node 400 can measure or determine a distance (D) to the UE 160. In some examples, the UE distance 136 is determined by measuring a signal strength of a received signal that is exchanged between the wireless access node 100 and the UE 160. The signal strength measurements can be performed by the wireless access node 400 and/or the UE 160. The UE distance 136 can be obtained by the wireless access node 400 requesting location information from the UE 160. The UE distance 136 can be obtained through the wireless access node 400 determining the distance to the UE 160 using triangulation and using information obtained from other, neighboring wireless access nodes. The UE distance 136 can be obtained through the wireless access node 400 obtaining GPS information for the UE 160 and using the GPS information to determine the location of the UE 160.

The UE direction angle (θ) 146 comprises a direction angle to the UE 160 with respect to a reference axis, such as to a reference compass axis, for example. The wireless access node 100 can determine or measure the UE direction angle (θ) 146. The UE direction angle (θ) 146 can be obtained by the wireless access node 400 requesting location information from the UE 160. The UE direction angle (θ) 146 can be obtained through the wireless access node 400 determining the direction angle to the UE 160 using triangulation and using information obtained from other, neighboring wireless access nodes. The UE direction angle (θ) 146 can be obtained through the wireless access node 400 obtaining GPS information for the UE 160 and using the GPS information to determine the direction angle to the UE 160.

The UE elevation angle (α) 156 comprises an elevation angle to the UE 160. The wireless access node 100 can determine or measure the UE elevation angle (α) 156 to the UE 160. The UE elevation angle (α) 156 can be positive when the UE 160 is at a higher elevation than the wireless access node 100 (or higher than the infrastructure 106). The elevation angle (α) can be negative when the UE 160 is at a lower elevation than the wireless access node 100 (or lower than the infrastructure 106).

The UE elevation angle (α) 156 can comprise a reliable indication that the UE 160 is located within the building 180. For example, a positive UE elevation angle (α) 156 is indicative of the UE being located above a ground floor, and is therefore a good indication that the UE 160 is in a building. This may be true even without determining the UE distance (D) 136 and the UE direction angle (θ) 146.

In some examples, the UE distance 136, the UE direction angle (θ) 146, and the UE elevation angle (α) 156 can comprise the UE location 116 of FIG. 1. The UE distance 136, the UE direction angle (θ) 146, and the UE elevation angle (α) 156 can therefore be in substitution to the UE location 116 of FIG. 1.

The band availability information 126 comprises information about whether building-penetrating frequencies are available. The band availability information 126 further comprises information about whether non-penetrating frequencies are available. The band availability information 126 therefore comprises information about which frequencies can be used for a CA communication mode. The band availability information 126 can be used to determine whether the wireless access node 400 should allocate a building-penetrating frequency or allocate a non-penetrating frequency. For example, if there are no non-penetrating frequencies available, then the wireless access node 400 will have to allocate a building-penetrating frequency to the UE 160. Conversely, if there are no building-penetrating frequencies available, then the wireless access node 400 will have to allocate a non-penetrating frequency to the UE 160.

In some examples, the allocating further comprises, if the UE in-building state is true and if a band availability information indicates that building-penetrating frequencies are available, then the wireless access node allocates the plurality of CA traffic channels to the UE from the building-penetrating frequency band, and if the UE in-building state is false or if the band availability information indicates that building-penetrating frequencies are unavailable, then the wireless access node allocates the plurality of CA traffic channels from a non-penetrating frequency band.

In some examples, the allocating further comprises, if the UE in-building state is true or if a band availability information indicates that non-penetrating frequencies are unavailable, then the wireless access node allocates the plurality of CA traffic channels to the UE from the building-penetrating frequency band.

The user access information 128 comprises information about whether a particular user (or UE) is to be allocated CA traffic channels from the building-penetrating frequency band. The user access information 128 may reflect a level of user service subscription, for example. However, it should be understood that whether building-penetrating frequencies or non-penetrating frequencies are allocated may also depend on frequency availability.

In some examples, the allocating further comprises, if the UE in-building state is true and if a user access information indicates that the UE is permitted to receive building-penetrating frequencies, then the wireless access node allocates the plurality of CA traffic channels to the UE from the building-penetrating frequency band, and if the UE in-building state is false or if the user access information indicates that the UE is not permitted to receive building-penetrating frequencies, then the wireless access node allocates the plurality of CA traffic channels from a non-penetrating frequency band.

In some examples, the carrier aggregation routine 113 when executed by the wireless access node 100 in general or the processing system 110 in particular operates to direct the wireless access node 100 or the processing system 110 to determine a UE distance 136 to a UE 160 in preparation for switching to a CA communication mode, determine a UE direction angle 146 to the UE 160, determine a UE elevation angle 156 to the UE 160, determine if the UE 160 is in-building using the UE distance 136, the UE direction angle 146, and the UE elevation angle 156 and setting a UE in-building state 119 based on the UE distance 136, the UE direction angle 146, and the UE elevation angle 156, and if the UE in-building state 119 is true, then allocate a plurality of CA traffic channels 141 to the UE 160 from a building-penetrating frequency band 123.

Figure 5:
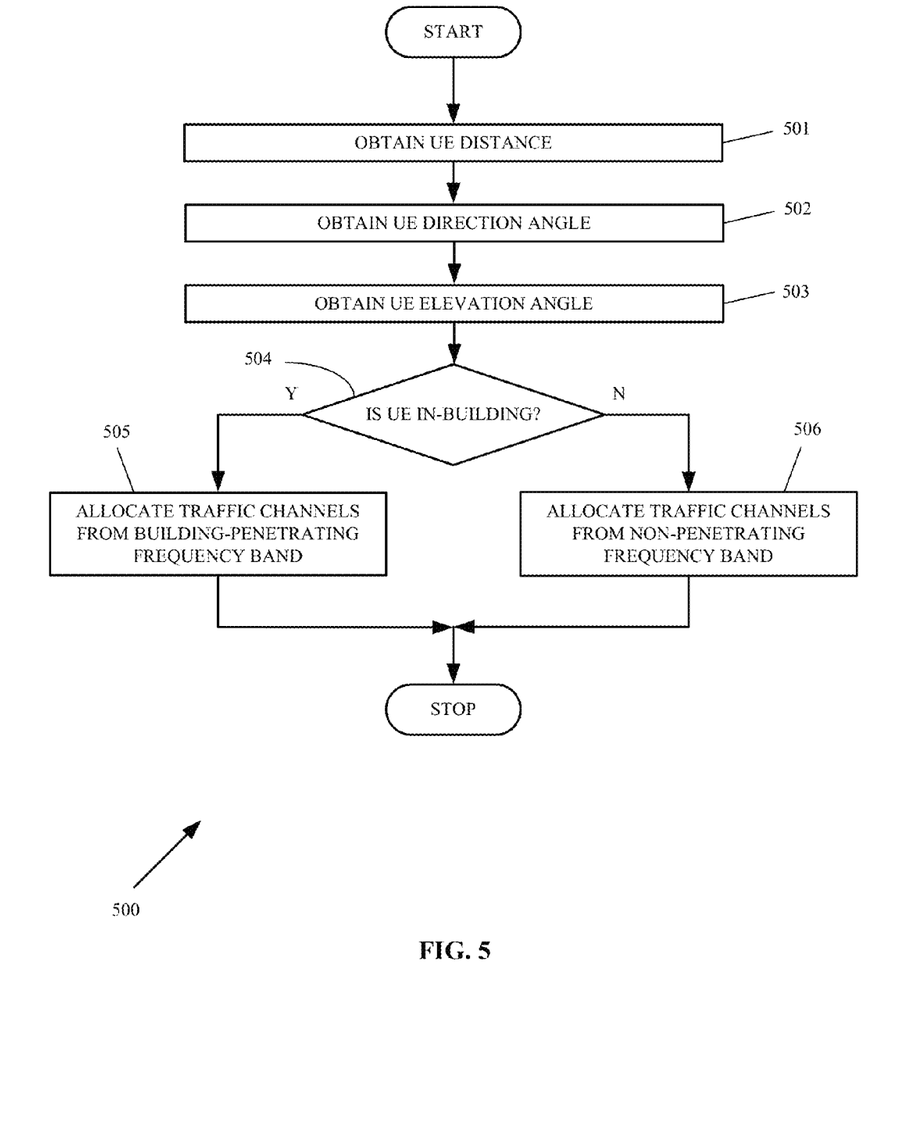
FIG. 5 is a flowchart of another exemplary carrier aggregation method for a CA communication mode between a wireless access node of a wireless access network and a UE device.

FIG. 5 is a flowchart 500 of another exemplary carrier aggregation method for a CA communication mode between a wireless access node of a wireless access network and a UE device. In step 501, the wireless access node determines a UE distance (D). The UE distance (D) comprises a distance measurement from the wireless access node to the UE, as previously discussed.

In step 502, the wireless access node determines a UE direction angle (θ). The UE direction angle (θ) comprises a direction angle to the UE with respect to a reference axis as previously discussed.

In step 503, the wireless access node determines a UE elevation angle (α). The UE elevation angle (α) comprises an elevation angle to the UE, as previously discussed.

In step 504, the wireless access node determines whether the UE is located within a building. The wireless access node uses one or more of the UE distance (D), the UE direction angle (θ), and the UE elevation angle (α) to determine the location of the UE with respect to the wireless access node. The wireless access node uses one or more of the UE distance (D), the UE direction angle (θ), and the UE elevation angle (α) to determine if the UE is in-building. If the UE is located within a building, then the wireless access node can allocate from a different frequency band than if the UE is not located within a building. If the UE is in-building, then the method branches to step 505. Otherwise, where the UE is not in-building, then the method branches to step 506.

In step 505, where the UE is in-building, the wireless access node allocates a plurality of traffic channels to the UE from a building-penetrating frequency band, as previously discussed.

In step 506, where the UE is not in-building, the wireless access node allocates a plurality of traffic channels to the UE from a non-penetrating frequency band, as previously discussed.

Referring to any of FIGS. 1, 2, and 4, the wireless communication environment in the examples can provide communication services including voice calls, text messages, data access, or other communication services provided over cellular or wireless communication networks. In some examples, the wireless communication environment includes equipment to provide wireless access to communication services to user devices within different coverage areas, route communications between content providers and user devices, and facilitate handoffs between equipment of different coverage areas, among other operations.

The wireless communication environment can include one or more wireless access nodes. The one or more wireless access nodes may be coupled together by communication links. The one or more wireless access nodes may be further coupled to other devices or networks, including telephone landlines or Internet links, for example. As a result, communications exchanged between the UEs and the wireless access node may be further provided to other devices within the wireless communication environment.

Referring to any of FIGS. 1, 2, and 4, the wireless communication environment comprises a LTE, LTE Advanced, or Evolved Universal Terrestrial Radio Access (EUTRA) wireless access network in some examples. The wireless access network can comprise a High Rate Packet Data (HRPD) or an evolved High Rate Packet Data (eHRPD) network, a Global System for Mobile communications (GSM) network, a Universal Mobile Telecommunications System (UMTS) network, a Code Division Multiple Access (CDMA) network, an Enhanced Voice-Data Optimized (EV-DO) network, a single-carrier radio transmission technology link (1xRTT) network, a High Speed Packet Access (HSPA) network, a Radio Link Protocol (RLP) network, a Worldwide Interoperability for Microwave Access (WiMAX) network, an Orthogonal Frequency-Division Multiple Access (OFDMA) network, a Single-carrier frequency-division multiple access (SC-FDMA) network, a Wideband Code Division Multiple Access (W-CDMA) network, a Time Division Synchronous Code Division Multiple Access (TD-SCDMA) network, an IEEE 802.11 network, a Wireless Fidelity (Wi-Fi) network, or some other cellular or wireless communication format, including combinations, improvements, or variations thereof. However, the above examples are illustrative and are not exhaustive. Other wireless access networks are contemplated and are within the scope of the description and claims. Further, the examples above apply equally well to improvements and enhancements of current wireless access networks.

Referring to any of FIGS. 1, 2, and 4, the wireless access node in the examples includes processing equipment, routing equipment, physical structures, and can also include transceiver equipment, antenna equipment, and other equipment. The wireless access node includes at least one transceiver and antenna for exchanging wireless communications with UEs in a particular sector of wireless coverage. It should be understood that the wireless access node could be distributed or consolidated among equipment or circuitry that together forms the elements of the wireless access node. Further equipment, networks, and systems can be communicatively coupled to the wireless access node, such as equipment, networks, and systems of cellular voice and data communication systems, but are omitted from the figures for clarity.

The wireless access node in the examples provides one or more wireless links in a cell or cell sector of wireless coverage in some examples. The wireless access node is capable of communicating with the UEs, and may be capable of communicating using a variety of frequencies and a variety of communication schemes. A wireless access node can provide one or more wireless links in some embodiments. A wireless access node can provide a cell or sector of wireless coverage in some embodiments. Any number of wireless access nodes can be included in the wireless communication environment.

The wireless access node in the examples can include elements such as radio access network (RAN) equipment, eNodeB equipment, Mobility Management Entity (MME) equipment, Home Subscriber Servers (HSS), Evolved Universal Terrestrial Radio Access (EUTRA) network equipment, a base station (BS), a base transceiver station (BTS), a base station controller (BSC), a mobile switching center (MSC), a home location register (HLR), a radio node controller (RNC), a call processing system, authentication, authorization and accounting (AAA) equipment, an access service network gateway (ASN-GW), a packet data switching node (PDSN), a home agent (HA), a mobility access gateway (MAG), an Internet access node, a telephony service node, a database, or other communication and control equipment.

The UEs and the wireless access node comprise communication circuitry and software to support one or more wireless protocols, such as LTE, CDMA, GSM, EVDO, and HSPA. The UEs and the wireless access node typically also comprise communication circuitry and software to support one or more data protocols, such as IP, Ethernet, packet voice, and the like. The wireless access node may have backhaul connectivity to one or more core networks over various wired and/or wireless data connections.

Referring to any of FIGS. 1, 2, and 4, the UEs can comprise a mobile device, including a cellular phone, but also may include other devices. The UEs can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof. The UEs may be integrated within other systems and devices, such as vehicles, appliances, apparel, and the like. The UEs detect and report various system conditions to the wireless access node, such as inter-cell interference and failed signaling access.

The UEs in the examples receive wireless access to communication services through the wireless access node. The communication services can include voice calls, text messaging, data exchange, multimedia streaming, and the like. The UEs can include one or more transceiver portions for communication over one or more wireless links of differing frequency bands. The UEs can receive wireless access information from one or more wireless access nodes, such as beacon signals, channel information, frequency information, overhead signaling, neighbor lists, and the like. The UEs can move among any of the coverage areas associated with the wireless communication environment and receive wireless access.

Referring to any of FIGS. 1, 2, and 4, the communication interface in the examples comprises a network card, network interface, port, or interface circuitry that allows the wireless access node to communicate with other communication devices over a variety of networks. The communication interface may also include a memory device, software, processing circuitry, or some other device. The communication interface may use various communication protocols, such as time division multiplex, internet, Ethernet, wireless, or some other communication format—including combinations thereof—to exchange communications as described herein for communication devices, such as anonymity factor and changes to the anonymity factor and mobility data.

The communication interface in the examples comprises an interface for communicating with one or more UEs. The communication interface receives command and control information and instructions from the processing system for controlling the operations of the communication interface and the UEs over wireless links, coordinating handoffs of the UEs between other wireless access systems, exchanging authentication or authorization information with other wireless access networks, providing parameters to one or more UEs, transferring neighbor list information, and transferring communications for delivery to a UE. The wireless link can use various protocols or communication formats as described herein, including combinations, variations, or improvements thereof.

The communication interface in the examples includes transceiver equipment for wirelessly exchanging user communications and overhead communications with user devices, omitted for clarity, using antenna arrays and the associated wireless links. The communication interface can include one or more antenna elements, RF coupling equipment, structural supports, cabling, or other equipment.

The processing system in the examples can comprise one or more microprocessors and other circuitry that retrieves and executes the carrier aggregation routine. The processing system can be implemented within a single processing device but can also be distributed across multiple processing devices or sub-systems that cooperate in executing program instructions. Examples of the processing system include general purpose central processing units, application specific processors, and logic devices, as well as any other type of processing device, combinations, or variations thereof. In some examples, the processing system includes a computer readable storage media capable of storing the carrier aggregation routine. The processing system can include volatile and non-volatile, removable and non-removable media implemented in any method or technology for storage of information, such as computer readable instructions, data structures, program modules, or other data.

In addition to storage media, in the examples the processing system can also include communication media over which the carrier aggregation routine can be communicated. The processing system can be implemented to include a single storage device but can also be implemented to include multiple storage devices or sub-systems co-located or distributed relative to each other. The processing system can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the carrier aggregation routine can, when loaded into the processing system and executed, transform the processing system into a special-purpose computing system configured to perform a switch to a carrier aggregation mode, among other operations. Encoding the carrier aggregation routine on the processing system can transform the physical structure of the processing system. The specific transformation of the physical structure can depend on various factors in different implementations of this description. Examples of such factors can include, but are not limited to the technology used to implement the storage media of the processing system and whether the computer-storage media are characterized as primary or secondary storage. For example, if the computer-storage media are implemented as semiconductor-based memory, the carrier aggregation routine can transform the physical state of the semiconductor memory when the program is encoded therein. For example, the carrier aggregation routine can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The carrier aggregation routine in the examples comprises computer programs, firmware, or some other form of machine-readable processing instructions. The carrier aggregation routine may include an operating system, utilities, drivers, network interfaces, applications, virtual machines, or some other type of software. The carrier aggregation routine can include additional processes, programs, or components, such as operating system software, database software, or application software. The carrier aggregation routine can also comprise firmware or some other form of machine-readable processing instructions executable by the processing system.

The carrier aggregation routine in the examples can include additional processes, programs, or components, such as operating system software, database software, or application software. The carrier aggregation routine can also comprise firmware or some other form of machine-readable processing instructions executable by the processing system.

Many aspects of the disclosure can be better understood with reference to the drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A wireless access node of a wireless access network configured to perform a carrier aggregation (CA) communication mode between the wireless access node and a User Equipment device (UE), comprising:
- a communication interface configured to allocate one or more traffic channels and a signaling channel between the wireless access node and the UE; and
- a processing system coupled to the communication interface and configured to:
- determine a UE location of the UE in preparation for switching to the CA communication mode, wherein the UE location comprises a UE distance to the UE, a UE direction angle to the UE, and a UE elevation angle to the UE;
- determine if the UE is in-building using the UE location and setting a UE in-building state based on the UE location:
- if the UE in-building state is true and if a band availability information indicates that building-penetrating frequencies are available, then allocate a plurality of CA traffic channels to the UE from a building-penetrating frequency band; and
- if the UE in-building state is false or if the band availability information indicates that the building-penetrating frequencies are unavailable, then allocate the plurality of CA traffic channels from a non-penetrating frequency band.

2. The wireless access node of claim 1, wherein the building-penetrating frequency band is used only for in-building UEs and wherein non-in-building UEs are not allocated traffic channels from the building-penetrating frequency band as long as there are non-building-penetrating frequency band traffic channels available to be allocated.

3. The wireless access node of claim 1, with the processing system further configured wherein:
- if the UE in-building state is true and if a user access information indicates that the UE is permitted to receive the building-penetrating frequencies, then allocate the plurality of CA traffic channels to the UE from the building-penetrating frequency band; and
- if the UE in-building state is false or if the user access information indicates that the UE is not permitted to receive the building-penetrating frequencies, then allocate the plurality of CA traffic channels from a non-penetrating frequency band.

4. A carrier aggregation (CA) method for a CA communication mode between a wireless access node of a wireless access network and a User Equipment device (UE), comprising:
- in the wireless access node, determining a UE location of the UE in preparation for switching to the CA communication mode, wherein determining the UE location comprises determining a UE distance to the UE, determining a UE direction angle to the UE, and determining a UE elevation angle to the UE;
- in the wireless access node, determining if the UE is in-building using the UE location and setting a UE in-building state based on the UE location; and
- in the wireless access node, if the UE in-building state is true and if a band availability information indicates that building-penetrating frequencies are available, then allocating a plurality of CA traffic channels to the UE from a building-penetrating frequency band; and if the UE in-building state is false or if the band availability information indicates that the building-penetrating frequencies are unavailable, then the wireless access node allocating the plurality of CA traffic channels from a non-penetrating frequency band.

5. The method of claim 4, wherein the building-penetrating frequency band is used only for in-building UEs and wherein non-in-building UEs are not allocated traffic channels from the building-penetrating frequency band as long as there are band traffic channels from the non-building-penetrating frequency available to be allocated.

6. The method of claim 4, further comprising:
- if the UE in-building state is true and if a user access information indicates that the UE is permitted to receive the building-penetrating frequencies, then the wireless access node allocating the plurality of CA traffic channels to the UE from the building-penetrating frequency band; and
- if the UE in-building state is false or if the user access information indicates that the UE is not permitted to receive the building-penetrating frequencies, then the wireless access node allocating the plurality of CA traffic channels from a non-penetrating frequency band.

7. One or more non-transitory computer-readable storage media having program instructions stored thereon for performing a carrier aggregation (CA) method for a CA communication mode between a wireless access node of a wireless access network and a User Equipment device (UE) that, when executed by a processing system, direct the processing system to at least:
- determine a UE location of the UE in preparation for switching to the CA communication mode, wherein the UE location comprises a UE distance to the UE, a UE direction angle to the UE, and a UE elevation angle to the UE;
- determine if the UE is in-building using the UE location and setting a UE in-building state based on the UE location;
- if the UE in-building state is true and if a band availability information indicates that building-penetrating frequencies are available, then allocate a plurality of CA traffic channels to the UE from a building-penetrating frequency band; and
- if the UE in-building state is false or if the band availability information indicates that the building-penetrating frequencies are unavailable, then allocate the plurality of CA traffic channels from a non-penetrating frequency band.

8. The one or more non-transitory computer-readable storage media of claim 7, further comprising:
- if the UE in-building state is true and if a user access information indicates that the UE is permitted to receive the building-penetrating frequencies, then allocate the plurality of CA traffic channels to the UE from the building-penetrating frequency band; and
- if the UE in-building state is false or if the user access information indicates that the UE is not permitted to receive the building-penetrating frequencies, then allocate the plurality of CA traffic channels from a non-penetrating frequency band.

* * * * *